(12) United States Patent
Shrader et al.

(10) Patent No.: US 6,742,922 B2
(45) Date of Patent: Jun. 1, 2004

(54) MIXER FOR FOAMED GYPSUM PRODUCTS

(75) Inventors: Gaylon Bruce Shrader, Atoka, TN (US); James W. McNeer, Jr., Germantown, TN (US); Craig L. Williams, West Memphis, AR (US)

(73) Assignee: Temple-Inland Forest Products Corporation, Austin, TX (US)

( * ) Notice: Subject to any disclaimer, the term of this patent is extended or adjusted under 35 U.S.C. 154(b) by 56 days.

(21) Appl. No.: 10/263,320

(22) Filed: Oct. 1, 2002

(65) Prior Publication Data

US 2004/0062141 A1 Apr. 1, 2004

(51) Int. Cl.$^7$ ................ B01F 5/00; B28C 5/00
(52) U.S. Cl. ................ 366/2; 386/30; 386/165.2
(58) Field of Search .............. 366/165.1, 165.2, 366/2, 30, 34

(56) References Cited

U.S. PATENT DOCUMENTS

| | | | | |
|---|---|---|---|---|
| 475,297 A | * | 5/1892 | Coates et al. ............ 239/104 |
| 998,762 A | * | 7/1911 | Faller ...................... 366/11 |
| 1,469,479 A | * | 10/1923 | Thomas .................... 239/405 |
| 1,660,243 A | | 2/1928 | Thomson |
| 2,639,901 A | | 5/1953 | Teale |
| 2,653,801 A | * | 9/1953 | De Gelder et. al. ...... 366/165.1 |
| 2,762,738 A | | 9/1956 | Teale ...................... 154/87 |
| 2,886,297 A | * | 5/1959 | Crandall ................. 366/165.2 |
| 2,985,219 A | | 5/1961 | Summerfield .............. 154/1 |
| 3,343,818 A | | 9/1967 | Piemons et al. |
| 3,454,688 A | | 7/1969 | Foster et al. .............. 264/42 |
| 3,459,620 A | | 8/1969 | McCleary et al. ........... 156/346 |
| 3,532,576 A | | 10/1970 | Proctor et al. ............. 156/348 |
| 3,625,724 A | | 12/1971 | Alvero .................... 366/10 |
| 3,929,947 A | | 12/1975 | Schwartz et al. ............ 264/42 |
| 4,057,443 A | | 11/1977 | Stiling et al. .............. 156/43 |
| 4,224,078 A | * | 9/1980 | Pilgrim .................... 106/783 |
| 4,270,576 A | * | 6/1981 | Takeda et al. ............. 366/165.2 |
| 4,279,673 A | | 7/1981 | White et al. ............... 156/39 |
| 4,475,817 A | * | 10/1984 | Brunt ..................... 366/165.1 |
| 4,676,835 A | | 6/1987 | Green et al. .............. 106/111 |
| 4,735,755 A | | 4/1988 | Bischops ................. 264/42 |
| 5,085,929 A | | 2/1992 | Bruce et al. ............. 428/309.9 |
| 5,158,612 A | | 10/1992 | Savoly et al. ............. 106/678 |
| 5,198,052 A | | 3/1993 | Ali ........................ 156/45 |
| 5,240,639 A | | 8/1993 | Diez et al. ............... 252/307 |
| 5,484,200 A | | 1/1996 | Bradshaw ................. 356/15 |
| 5,683,635 A | | 11/1997 | Sucech et al. ............ 264/42 |
| 5,806,976 A | * | 9/1998 | Roque .................... 366/165.1 |
| 6,207,005 B1 | * | 3/2001 | Henley et al. ........... 156/345.32 |

* cited by examiner

Primary Examiner—Tony G. Soohoo
(74) Attorney, Agent, or Firm—Conley Rose, P.C.; Michael W. Piper (57) ABSTRACT

Apparatus for mixing aqueous foam with a slurry of gypsum and water. A cylindrical housing includes, in its upper end, an inlet for a slurry and a helical diverter for directing the slurry in a downward spiral flow path. An inlet for aqueous foam in located in said diverted and directs the foam into the incoming slurry. An annular flow restrictor is located in the lower end of the housing. Turbulence resulting from diversion of the incoming slurry from linear flow to a downward spiral flow path and from changes in spin diameter and speed through the flow restrictor uniformly mix foam with the slurry.

33 Claims, 5 Drawing Sheets

MIXER FOR FOAMED GYPSUM PRODUCTS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to foamed gypsum products and more particularly to a mixer for preparing a foamed gypsum slurry for use in making foamed gypsum products.

Gypsum wallboard is a common building material. It generally is made of a hardened gypsum plaster, i.e. a mixture of calcium sulfate and water, sandwiched between two facing sheets, typically paper. It is common to mix foam with the gypsum plaster to produce a product having less weight. Various systems have been developed for making foamed gypsum wallboard with a hard edge, see for example U.S. Pat. No. 4,279,673 issued to White et al. on Jul. 21, 1981. In the White patent a first rotary mixer is used to mix calcined gypsum, water, and foam and other rotary mixers are used to defoam portions of the output of the first mixer to provide a more dense plaster for making the hard edges.

Efficient use of foam reduces costs and can improve finished product quality. As a result, efforts have been made to more efficiently mix foam with a gypsum plaster to reduce the amount of foam generating chemicals used, see for example U.S. Pat. No. 5,484,200 issued to Bradshaw on Jan. 16, 1996. In the Bradshaw patent, one rotary mixer is used to mix calcined gypsum and water, and a second mixer is used to mix foam with the slurry produced in the first mixer.

It would be desirable to provide a system for efficiently mixing foam into a gypsum slurry without requiring the use of additional energy required by secondary rotary mixers.

SUMMARY OF THE INVENTION

The present invention provides an apparatus for mixing an aqueous foam with a calcined gypsum and water slurry. The apparatus includes a cylindrical mixing chamber having a slurry diverter at a first end and a circular constriction at a second end. The chamber has an inlet near its first end for receiving a flow of calcined gypsum and water slurry between its central axis and outer wall. The diverter directs the flow in a spiral or helical path. Aqueous foam is injected into the inlet, preferably through the diverter, and mixes with the slurry by turbulence as the slurry spins in the chamber. The circular constriction causes further turbulence to further mix the foam with the gypsum slurry.

DETAILED DESCRIPTION OF THE INVENTION

Figure 1:
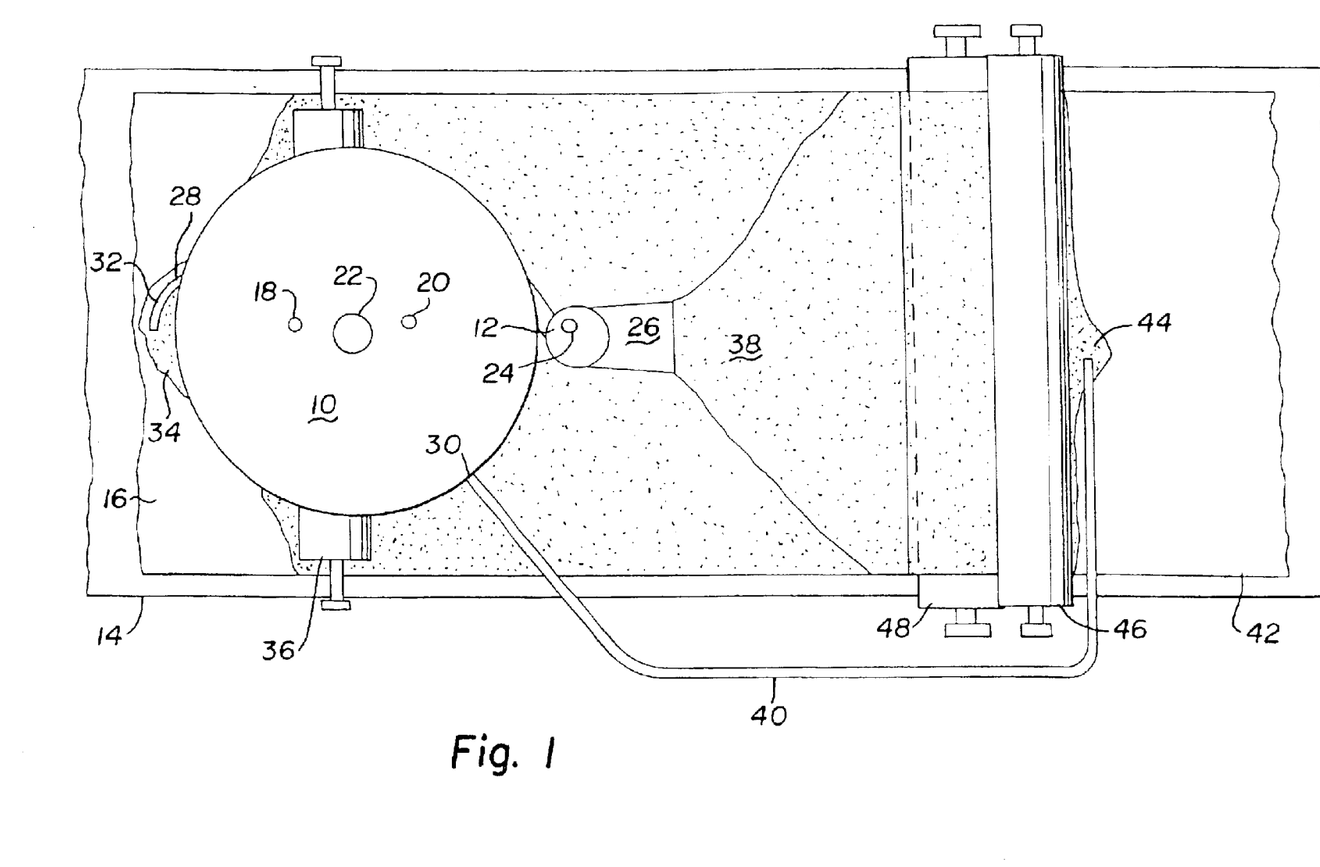
FIGS. 1 and 2 are top and side views respectively of a gypsum wallboard manufacturing system in which a secondary mixer of the present invention is useful.
Figure 2:
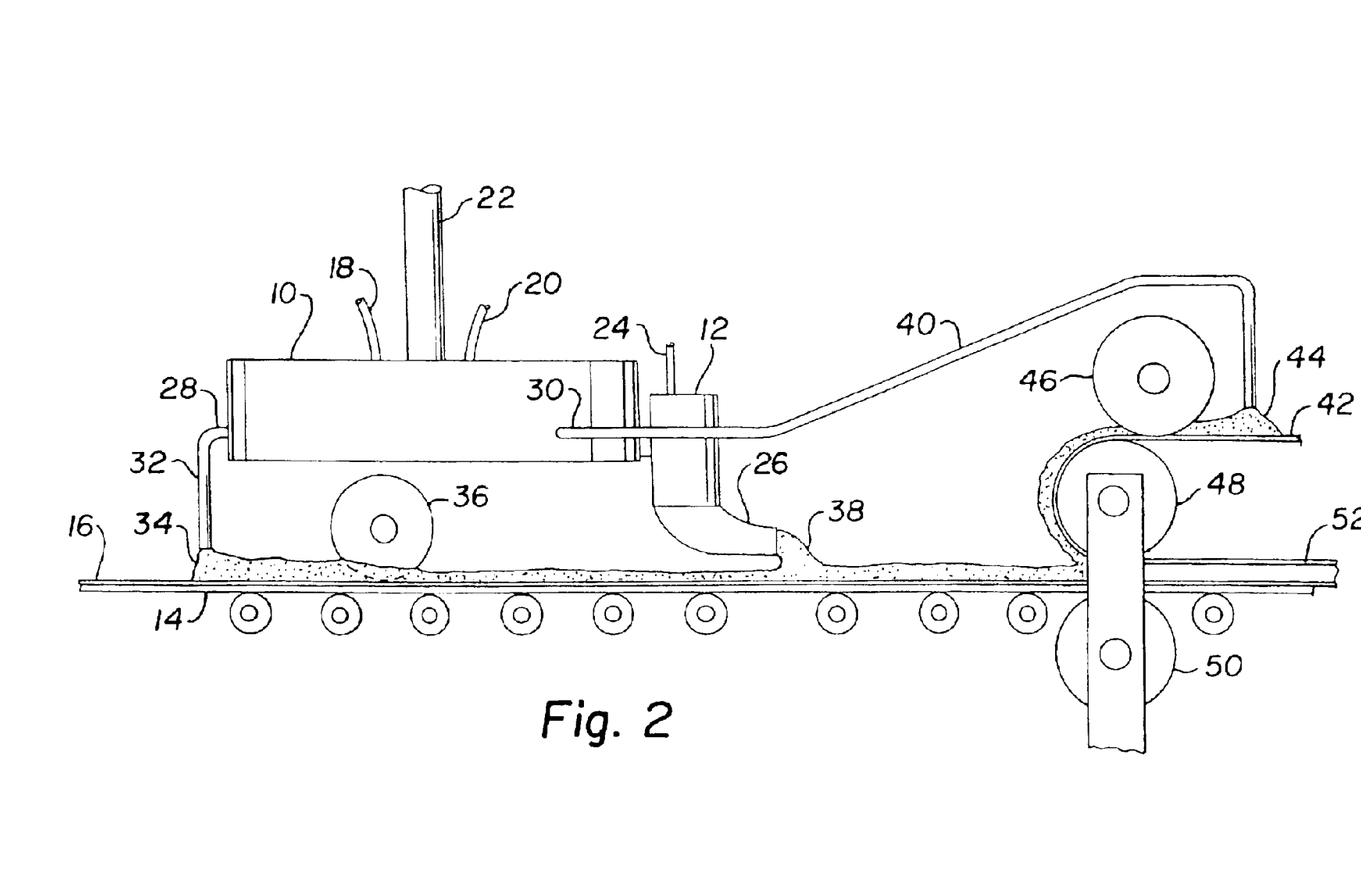

With reference to FIGS. 1 and 2, there is illustrated a system for making gypsum wallboard in accordance with an embodiment of the present invention. In these figures, a primary mixer 10 and a secondary mixer 12 are shown positioned above a conveyor belt 14. A first face sheet 16 is carried on the conveyor belt 14, moving from left to right in the figures. The primary mixer 10 has inlets 18 and 20 through which calcined gypsum and water are flowed into the mixer 10. A rotating shaft 22 turns a mixing disc inside mixer 10 to produce an aqueous gypsum slurry. The slurry flows from an outlet of mixer 10 into an inlet of secondary mixer 12. Mixer 12 has an inlet 24 through which an aqueous foam is flowed into the mixer 12 for mixing with the gypsum slurry to form a foamed gypsum slurry. The foamed gypsum slurry is discharged through a discharge conduit 26.

The term gypsum slurry or gypsum and water slurry is used herein to refer to a mixture made primarily by mixing calcined gypsum with water. Calcined gypsum is primarily calcium sulphate from which at least part of the water of hydration has been removed. Calcined gypsum begins reacting with water on contact to form the fully hydrated form of gypsum. The dry calcined gypsum is in the form of small particles or a powder which forms a slurry or plaster when blended with water in mixer 10. As the hydration process is completed, the slurry hardens into the fairly rigid form which provides the primary structure of gypsum wallboard.

The primary mixer 10 has two other discharge outlets 28 and 30 through which the aqueous gypsum slurry is discharged. The unfoamed slurry flowing out of outlet 28 is carried by a discharge conduit 32 and deposited onto the face sheet 16 at 34. The deposited slurry 34 is carried by the moving face sheet 16 under a roller 36 which spreads the slurry 34 across the cover sheet. A portion of the slurry 34 may flow around the ends of the roller 36. As an alternative to roller 36, the slurry 34 may be sprayed onto the face sheet 16. As the face sheet 16, now covered with the slurry 34, passes under the outlet conduit 26 of the secondary mixer 12, foamed gypsum slurry 38 is deposited on top of the layer 34.

The unfoamed slurry flowing out of discharge outlet 30 is carried by a discharge conduit 40 and deposited on a second face sheet 42 at 44. The second face sheet 42 moves under a roller 46 which spreads the deposited slurry 44 across the face sheet 42. The face sheet 42 then passes around another roller 48 and is pressed, slurry side down, on top of the slurry layers already deposited on the first face sheet 16. The roller 48 and a roller 50 under the conveyor belt 14 set the thickness of the sandwich 52 of face sheets 16 and 42 and combined layers of gypsum plaster 34, 38 and 44. The resulting product 52 is allowed to harden, and is cut to a desired length and dried by processes well known in the art.

While the slurry layers 34 and 44 are described above as being unfoamed, they may contain some foam if desired. For example, foam could be one of the additives inserted into the primary mixer 10. However, these layers would normally have much less foam than the foamed slurry 38 produced in the secondary mixer 12, and for purposes of this disclosure can be considered unfoamed relative to slurry 38.

Figure 3:
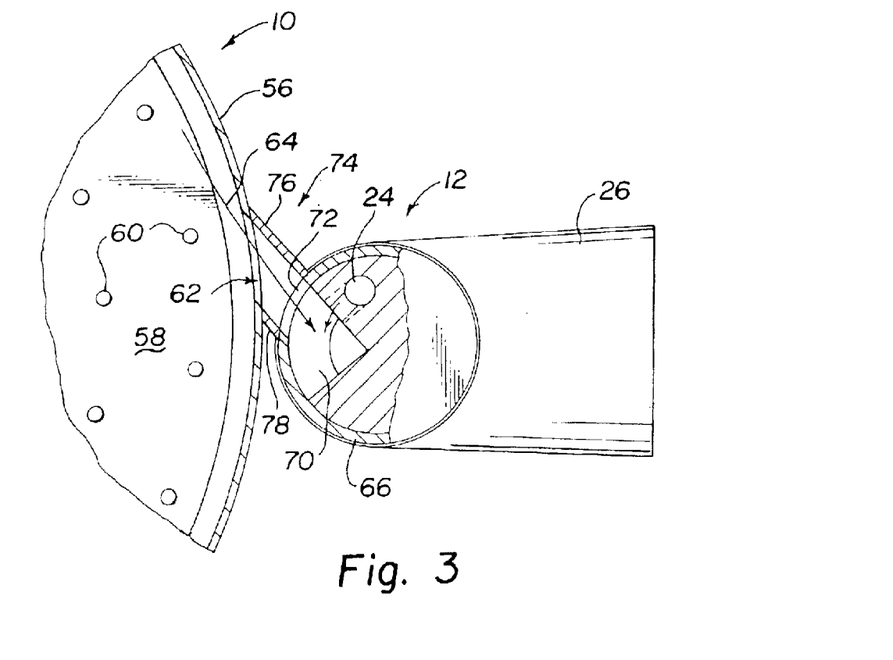
FIGS. 3 and 4 are top and side cross sectional views of a secondary mixer according to the present invention and a portion of a primary mixer shown in FIGS. 1 and 2.
Figure 4:
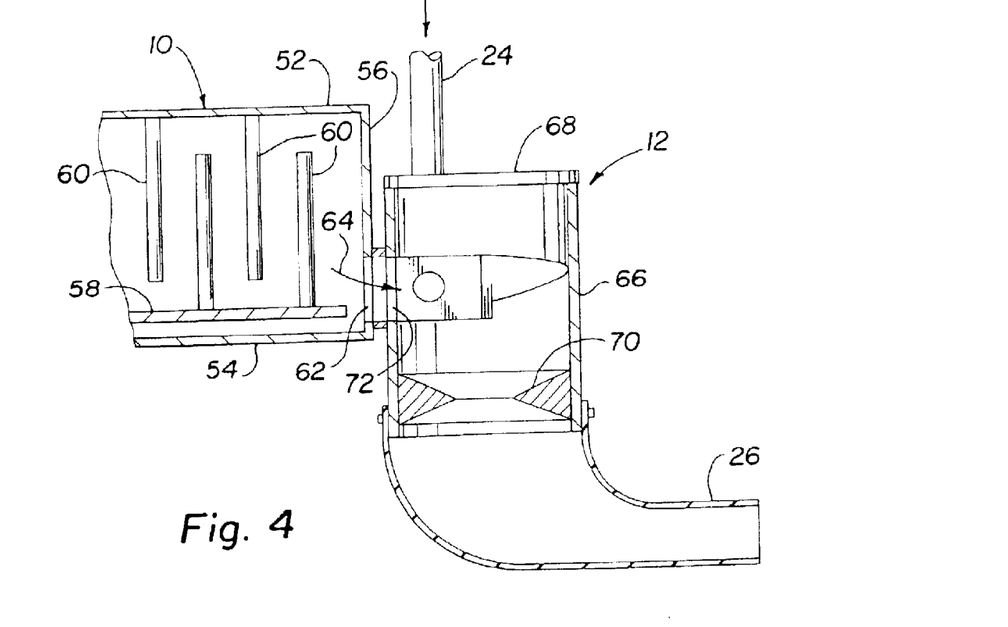

With reference to FIGS. 3 and 4, the inner structures of the primary mixer 10 and secondary mixer 12 shown in FIGS.

1 and 2 are illustrated. The primary mixer 10 has a cylindrical housing having a flat top wall 52 and flat bottom wall 54 connected by a cylindrical sidewall 56. Within the housing is a rotating mixing disc 58 driven by the shaft 22 (FIGS. 1 and 2). The rotating disc 58 and top wall 52 may carry pins 60 which generate turbulence in the gypsum slurry in primary mixer 10 as the disc 58 spins. The pins 60 are optional and a pinless primary mixer may be used if desired. These components of primary mixer 10 are essentially conventional. The mixer 10 has a discharge outlet 62 through which a gypsum slurry is discharged as indicated by the arrow 64.

The secondary mixer 12 is assembled in a cylindrical housing or can, i.e. canister, 66. A diverter 68 has a top portion which forms a fluid tight seal over the upper end of housing 66. The bottom surface of diverter 68 has a helical shape which causes slurry from mixer 10 to flow downward in a helical path through the housing 66. In the lower end of housing 66 is a toroidal or donut shaped restriction 70. The outlet conduit 26 is connected to the bottom of housing 66. The foam inlet 24 is preferably a passageway formed through diverter 68. It provides a flow path from the top of diverter 68 to a lower surface of the diverter 68 inside housing 66. Secondary mixer 12 has an inlet 72 for receiving gypsum slurry from primary mixer outlet 62.

A discharge gate 74 mechanically connects the secondary mixer 12 to primary mixer 10 and provides a flow path directing gypsum slurry from mixer 10 outlet 62 to mixer 12 inlet 72. The flow path is primarily defined by two sidewalls 76 and 78. Sidewall 76 is connected at one end almost tangentially to sidewall 56 of mixer 10 and on the other end is connected at about a right angle to the housing 66. Sidewall 78 is substantially parallel to sidewall 76 and spaced so that it is connected substantially tangentially to housing 66. This arrangement of gate 74 directs gypsum slurry into inlet 72 on only one side of the central vertical axis of housing 66 and substantially tangential to its inner surface. As illustrated in FIG. 3, foam which is flowed into inlet 24 flows into the stream of slurry which flows into inlet 72.

In the embodiment shown in FIGS. 1 and 2, the secondary mixer 12 has a central axis which is vertically positioned. Positional references such as upper, lower, sides, etc. are with reference to this vertical orientation of mixer 12. It is not necessary that mixer 12 have this orientation. It may be positioned so that its central axis is horizontal and the inlet 72 is under the primary mixer 10. The outlet from primary mixer 10 may be on its bottom. The slurry may flow down from the outlet of mixer 10 into the inlet 72 facing upward. Since the secondary mixer 12 is normally filled with slurry during operation, it should provide the mixing functions described herein whether it is vertically or horizontally positioned.

Figure 5:
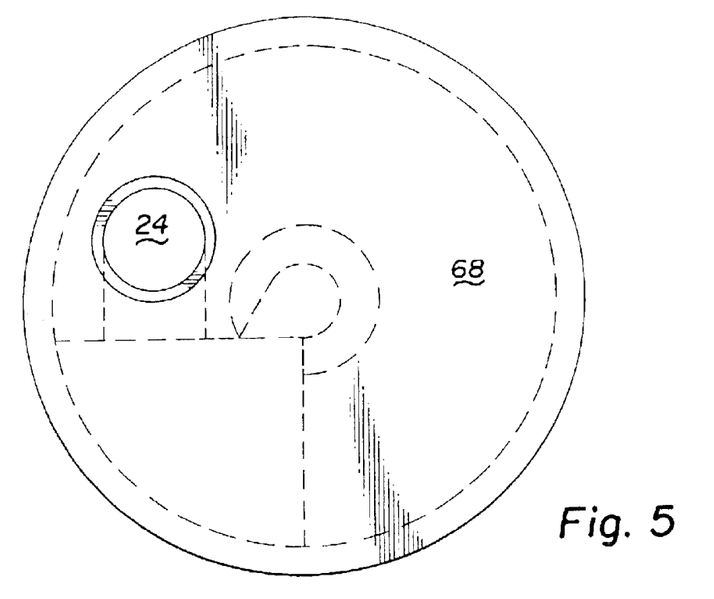
FIG. 5 is a top view of a diverter forming part of the secondary mixer.
Figure 6:
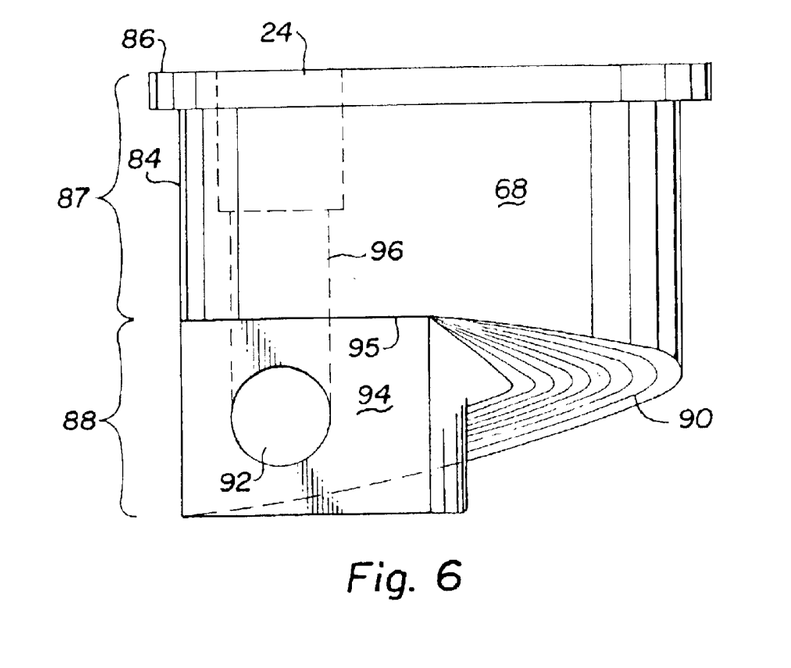
FIGS. 6, 7 and 8 are side views of the diverter of FIG. 5 from three different directions.
Figure 7:
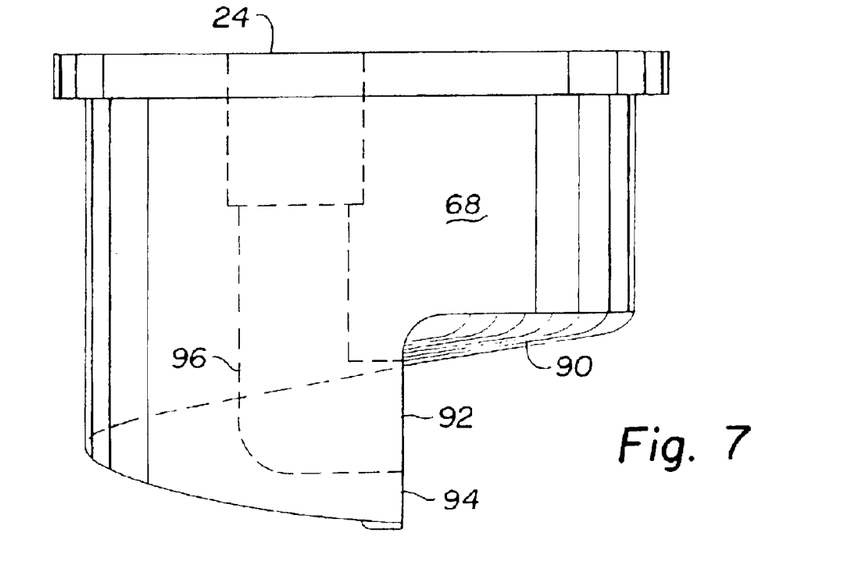
Figure 8:
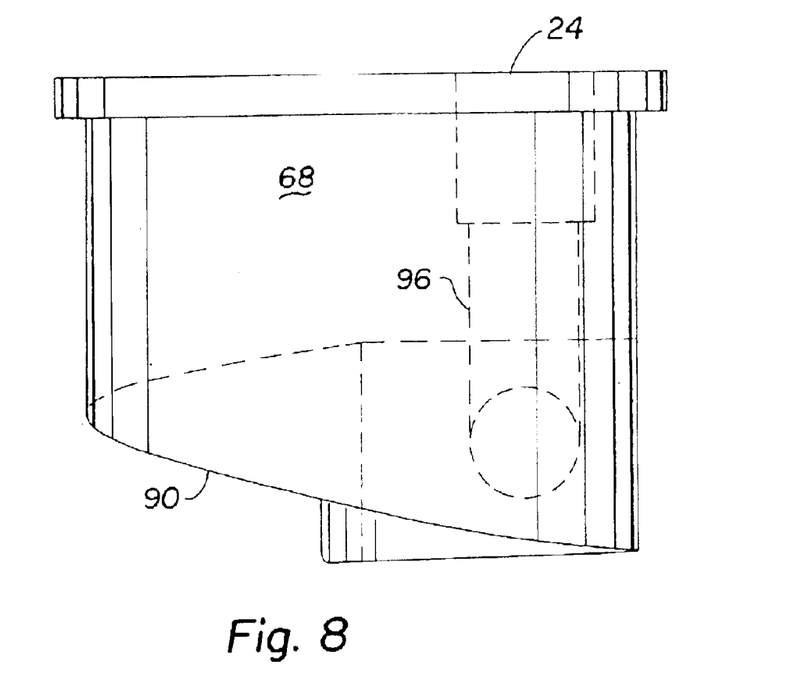

With reference to FIGS. 5 through 8, the detailed structure of an embodiment of a diverter 68 will be described. FIG. 5 is a top view. FIGS. 6, 7, and 8 are side views from three sides. The diverter 68 may be formed, e.g. by machining, from a single piece of metal or plastic. The top portion 82 is essentially a solid cylinder having a diameter at 84 for closely fitting within housing 66 (FIG. 4) and a flange 86 having an outer diameter about equal to the outer diameter of housing 66. The lower portion of diverter 68 includes a spiral or helical diverter bottom surface 90 and a port 92 through which foam flows into mixer 12. The helical surface 90 extends for about 225° to about 270°, as illustrated, of the way around the diverter 68. This results in having a vertical surface 94 extending from the level of the top of the helical surface to the level of the bottom of the helical surface. The port 92 opens through the vertical surface 94. It also creates a downward facing horizontal surface 95, in the shape of a quarter circle extending from the top edge of surface 94. When diverter 68 is installed in the housing 66, the vertical surface 94 may be aligned with wall 76 of gate 74 as illustrated in FIG. 3. The diverter may be rotated counterclockwise up to about 80° from the position shown in FIG. 3 to close off part of the inlet 72 to adjust flow conditions of the slurry as it flows through the secondary mixer 12. The horizontal surface 95 is aligned with the top of the inlet 72. As indicated by dashed lines 96, a flow path from foam inlet 24 to port 92 is formed, e.g. by drilling, through the otherwise solid diverter 68. The upper portion of flow path 96 is shown with an enlarged diameter portion which may be internally threaded for connection to an externally threaded pipe or fitting.

In the embodiment described herein, the mixing disk 58 in the primary mixer 10 spins clockwise and the slurry spins counterclockwise in secondary mixer 12 as seen from above. The diverter 68 may be rotated counterclockwise from the position shown in FIG. 3 to regulate flow of slurry into inlet 72. These rotational directions are not required, and the system may be made with these rotational directions reversed if desired.

In this embodiment, the diverter 68 has an overall height of about four inches and a diameter of about five inches, except for the flange 86 which has a diameter of about five and one-half inches. The bottom half 88 of the diverter 68, has a height of about two inches. With these dimensions, the slope of the helical surface at the outer circumference of the diverter 68 is about ten degrees relative to the horizontal surface 95. The slope of a helix varies radially, getting steeper at the center of the helix.

With further reference to FIGS. 3 and 4, more details of operation of the present invention will be described. Calcined gypsum and water (and other additives as desired) are mixed in primary mixer 10 by the spinning disc 58 and pins 60. The resulting slurry flows through outlet 62, through discharge gate 74 and into inlet 72 of the secondary mixer 12. A foam generator, not shown, mixes water, a surfactant (soap), and air to produce an aqueous foam. Surfactants useful in producing foamed gypsum wallboard include products such as those sold by GEO Specialty Chemicals, Inc. under the names Hyonic® PFM, PFM 10, PFM 15 and PFM 33, and those sold by Stepan Company under the names FA 406 and Alpha Foamer®. The foam is inserted through the diverter 68 and out port 92 where it meets the flow of slurry entering inlet 72 at about a right angle. The volume of foam is normally about one tenth the volume of gypsum slurry. The combined streams are diverted by the helical surface 90 to flow downward in a spiral or helical path inside housing 66. This diversion and spinning action generates turbulence which mixes the foam and gypsum slurry.

At the lower end of housing 66, the combined stream encounters the flow restriction or restrictor 70. The restrictor 70 improves mixing of the foam with the gypsum slurry. Since the diameter of the spinning fluid must be reduced to pass through the restriction, the spin rate increases according to the laws of conservation of angular momentum. As the fluid passes out the bottom of restrictor 70, it returns to its original spin diameter and rate. These changes in spin diameter and rate also cause turbulent flow which improves substantially uniform mixing of the foam with the gypsum slurry. As a result, a substantially uniformly mixed foamed gypsum slurry is discharged into outlet conduit 26 for use in making gypsum wallboard.

The present invention resulted from several discoveries made during the development of the present system. Various sizes, positions and angles for a foam injection port were tested in efforts to improve uniformity of mixing and reduce soap usage. One inlet location tested was through the wall 76 of discharge gate 74 adjacent the inlet 72. Several different inlet sizes and angles relative to slurry flow were tried. These arrangements generally resulted in good production of foamed slurry, but it was noticed that soap usage varied. When the foam inlet was placed in the diverter as illustrated in the figures, a substantial reduction in foam use was observed. It was discovered that by injecting foam through the diverter inside housing 66, the back pressure at the outlet of the foam generator dropped by almost fifty percent. The reduced back pressure on the foam generator apparently improves the efficiency of foam production and/or reduces foam instability as the foam flows from the generator to the mixing chamber 12.

For purposes of describing the present invention, several angular relationships must be considered. One is the direction of flow of foam from inlet 92 relative to the flow of slurry entering inlet 72 of mixer 12. The flow of slurry is assumed to be parallel to the surface 94. If inlet 92 could be directed directly opposite the flow of the slurry it would be considered at zero degrees and if it could be directed directly with the inlet flow it would be considered at 180 degrees. In the illustrated embodiment, it is at about 90 degrees to the inlet flow. As noted above, testing of inlet angles previously indicated various results. We believe that the inlet angle should be between about 75 degrees and about 105 degrees, more preferably from about 80 degrees and about 100 degrees, and most preferably about 90 degrees.

While the inlet 92 is illustrated positioned on the vertical wall 94, it could also be located through the horizontal wall 95 or through any part of the helical surface 90. These alternate locations would generally direct the flow of foam downward into the slurry and at about ninety degrees to the direction of flow of the slurry. The direction relative to the direction of flow of slurry could be any of those discussed above. The location of inlet 92 can also be described with respect to its radial location relative to the vertical wall 94. The wall 94 is considered zero degrees and the horizontal wall 95 extends for ninety degrees radially relative to wall 94. The helical surface 90 starts at the ninety-degree location and extends for about 225 to 270 degrees to about the 360 degree location, which of course is back to the zero degree location. It is preferred for the foam injection point to be located within 180 degrees, more preferably within 90 degrees and most preferably within 30 degrees of the wall 94.

The illustrated embodiment has a single foam inlet port 92 in a lower surface of the diverter 68. Multiple inlet ports may be used if desired. The multiple ports may all be placed at any one or combinations of the locations discussed above. For example, several inlets could be provided through the surface 94. Or one or more inlets could be provided in surface 94 in combination with one or more inlets through the horizontal surface 95 and/or through the helical surface 90.

It may also be desirable to provide the foam inlet into the secondary mixer through the housing 66. One or more inlets can be provided at various locations, for example adjacent the inlet 72. In an alternate embodiment having the foam inlet through the wall of housing 66, the secondary mixer 12 may be operated without the diverter 68. Helical flow of the gypsum water slurry may be achieved by directing the inlet flow horizontally between the central axis and sidewall of housing 66 as illustrated in FIG. 3. Forces including the outlet pressure from primary mixer 10, the momentum of the slurry entering inlet 72 and gravity will naturally cause the slurry to spin in housing 66. By proper design of the restrictor, the combination of helical flow and spin rate changes through the restrictor 70 should provide good mixing of foam with the gypsum slurry.

It was also discovered that the shape of the bottom surface 90 of the diverter 68 has a significant effect on foam usage. The embodiment shown in FIGS. 5 through 8 includes a helical bottom surface extending from about 225° to about 270°, i.e. about three quarters of the way, around the bottom of diverter 68 and having a continuous slope at the outer circumference relative to horizontal of about 10° or about 80° relative to the central axis of the mixer 12.

Two prior art diverters having much steeper deflecting areas or transition zones from horizontal to downward flow were also tested. These diverters had a somewhat conical bottom surface, i.e. the center of bottom of the diverter was lower than the circumference of the bottom. Each had an inlet area having a vertical wall from the center to the circumference like surface 94 and a quarter circle horizontal surface like surface 95. In one such diverter, the transition zone was positioned in less than 45° and another in less than 90° of the radial distance around the bottom of the diverter. Each of these transition zones started at about the ninety-degree point relative to the surface equivalent to surface 94. In terms of slope of the transition zone at the outer circumference relative to horizontal, these diverters had angles of greater than 45° and 30° respectively. Soap usage was found to be higher for the diverter with the 45° angle than for the diverter with the 30° angle. Thus it was observed that as the angle decreased, the soap usage was reduced. This observation led to development of the embodiment described herein having a continuous slope of about ten degrees which reduced the soap usage by about ten to thirteen percent as compared the diverter with the 45° angle.

In development of the present invention, various sizes of flow restrictors 70 were also tested and found to affect mixing of foam with gypsum slurry. As noted above, the inside diameter of housing 66 was about five inches. The outer diameter of restrictor 70 is sized to fit closely to this inner diameter of housing 66. When the inner diameter of restrictor 70 was reduced from 2.75 inches to 2.25 inches at a slurry flow rate of about 2190 pounds per minute, more uniform mixing of foam with slurry was achieved. We believe that this improvement in mixing was a result of increasing the turbulence or shear forces caused by the changes in spin diameter and speed of the fluids as they pass through the restrictor. Increasing the ratio of the outer diameter to inner diameter of the restrictor 70, appears to increase the turbulence or shear forces which cause uniform mixing of the foam and slurry.

In the above example, the slurry flow rate relative to the area of the restrictor opening was about 368 pounds per minute per square inch for the 2.75 inch opening and about 551 pounds per minute per square inch for the 2.25 inch opening. Good results were also obtained at a production rate of 2500 pounds per minute using a restrictor opening of 2.375 inch which gives a flow rate of about 564 pounds per minute per square inch. Good results were also obtained at a production rate of 1200 pounds per minute using a restrictor opening of 1.75 inch which gives a flow rate of about 500 pounds per minute per square inch. Thus, improved results were obtained by increasing the restrictor flow rate from below 400 pounds per minute per square inch to the range of 500 to 600 pounds per minute per square inch. We anticipate that use of a restrictor having an opening diameter of 2.125 inch, which will provide a flow rate of about 616 pounds per minute per square inch at a production rate of about 2190 pounds per minute, will also provide good mixing of foam with the gypsum slurry. These ranges may of course be scaled to accommodate canisters having diameters other than 5 inches.

Another feature of the restrictor which is believed to influence the mixing achieved as the fluids flow through the restrictor is the slope of the upper surface of the restrictor. As shown in FIG. 4, the top of the restrictor 70 is basically cone or funnel shaped, having about a constant slope from the outer edge to the inner diameter through which the fluids flow. This slope, in combination with the total mass flow rate through the mixer 12, affects the rate of acceleration of the slurry as it flows into and through the restrictor. The ratio of outer to inner diameter affects the total increase in spin rate which the fluid experiences as it moves from the top of the restrictor to the center opening. As total flow rate increases, the total increase in spin rate occurs more quickly, increasing shear forces. In the preferred embodiment, the slope of the top surface of the restrictor is about 45 degrees. As the inner diameter is changed, and therefore the ratio of inner diameter to outer diameter is changed, it is preferred to maintain this slope at about 45 degrees. To provide for convenient replacement of restrictors for various operating flow rates it is desirable that the overall height of the restrictor remain constant. This can be accomplished by adjusting the slope of the lower surface of the restrictor 70.

The embodiment described herein has resulted in a total reduction of soap usage of about twenty-five percent. It was found to have other advantages. The foam is more uniformly mixed with the slurry. The diverter is self cleaning. Formation of slurry lumps in the secondary mixer inlet is essentially eliminated.

While the present invention has been illustrated and described in terms of particular apparatus and methods of use, it is apparent that equivalent parts may be substituted of those shown and other changes can be made within the scope of the present invention as defined by the appended claims.

What is claimed is:

1. A mixer for mixing a foamed liquid with a gypsum slurry comprising:
   a cylindrical housing having a first end, a second end, and a central axis;
   a gypsum slurry inlet in the first end of said housing positioned to direct a flow of gypsum slurry between said central axis and a side wall of said housing;
   a helical diverter in the first end of said housing adjacent said slurry inlet;
   a foamed liquid inlet; and
   a circular constriction in the second end of said housing.

2. A mixer according to claim 1, wherein said foamed liquid inlet is in said diverter.

3. A mixer according to claim 1, wherein:
   said foamed liquid inlet is adjacent said gypsum slurry inlet and positioned to direct the flow of foamed liquid at about seventy-five degrees to about one hundred five degrees relative to the direction of flow of said slurry into said gypsum slurry inlet.

4. A mixer according to claim 3, wherein:
   said foamed liquid inlet is positioned to direct the flow of foamed liquid at about eighty degrees to about one hundred relative to the direction of flow of said slurry into said gypsum slurry inlet.

5. A mixer according to claim 3, wherein:
   said foamed liquid inlet is positioned to direct the flow of foamed liquid at about ninety degrees relative to the direction of flow of said slurry into said gypsum slurry inlet.

6. A mixer according to claim 1, wherein:
   said circular constriction is sized to improve mixing of foam with gypsum slurry.

7. A mixer according to claim 1, wherein:
   said circular constriction has an inner diameter selected to provide a slurry flow rate of greater than 450 pounds per minute per square inch.

8. A mixer according to claim 7, wherein:
   said circular constriction has an inner diameter selected to provide a slurry flow rate of greater than about 500 pounds per minute per square inch.

9. A mixer according to claim 1, wherein:
   said circular constriction has an inner diameter selected to provide a slurry flow rate of from about 450 pounds per minute per square inch to about 650 pounds per minute per square inch.

10. A mixer according to claim 9, wherein:
    said circular constriction has an inner diameter selected to provide a slurry flow rate of from about 500 pounds per minute per square inch to about 650 pounds per minute per square inch.

11. A mixer according to claim 10, wherein:
    said circular constriction has an inner diameter selected to provide a slurry flow rate of from about 500 pounds per minute per square inch to about 600 pounds per minute per square inch.

12. A mixer according to claim 1, wherein:
    said helical diverter comprises a substantially solid cylinder having an outer diameter of about the inner diameter of said housing and a surface having a helical shape.

13. A mixer according to claim 12, wherein:
    said helical shape has a slope angle at its outer circumference relative to said central axis of greater than sixty degrees.

14. A mixer according to claim 12, wherein:
    said helical shape has a slope angle at its outer circumference relative to said central axis of greater than seventy degrees.

15. A mixer according to claim 12, wherein:
    said helical shape has a slope angle at its outer circumference relative to said central axis of about eighty degrees.

16. A mixer according to claim 15, wherein:
    said helical shape has a substantially continuous slope angle at its outer circumference.

17. A foamed gypsum slurry mixing system comprising:
    a first mixing chamber having one or more inlets for gypsum and a liquid medium, a mechanical agitator, and an outlet for discharging an initial slurry of said gypsum and liquid medium;
    an inlet positioned to flow a foamed liquid into said initial slurry; and
    a second mixing chamber having a cylindrical housing with a central axis, an initial slurry inlet coupled to said first mixing chamber outlet, a diverter, a circular constrictor, and an outlet for discharging a foamed slurry of gypsum and liquid medium;
    said diverter having a helical surface having a continuous angle relative to said central axis of said housing of greater than sixty degrees.

18. A mixer according to claim 17, wherein:

said circular constrictor is sized to improve mixing of foam with gypsum slurry.

19. A mixer according to claim 17, wherein:

said circular constrictor has an inner diameter selected to provide a slurry flow rate of greater than 450 pounds per minute per square inch.

20. A mixer according to claim 19, wherein:

said circular constrictor has an inner diameter selected to provide a slurry flow rate of greater than about 500 pounds per minute per square inch.

21. A mixer according to claim 17, wherein:

said circular constrictor has an inner diameter selected to provide a slurry flow rate of from about 450 pounds per minute per square inch to about 650 pounds per minute per square inch.

22. A mixer according to claim 21, wherein:

said circular constrictor has an inner diameter selected to provide a slurry flow rate of from about 500 pounds per minute per square inch to about 650 pounds per minute per square inch.

23. A mixer according to claim 21, wherein:

said circular constrictor has an inner diameter selected to provide a slurry flow rate of from about 500 pounds per minute per square inch to about 600 pounds per minute per square inch.

24. A foamed gypsum slurry mixing system according to claim 17, wherein:

said second mixing chamber comprises a cylindrical housing containing said helical diverter in a first end and said circular constriction in a second end.

25. A foamed gypsum slurry mixing system according to claim 24, wherein:

said second mixer slurry inlet comprises an opening in said housing adjacent said helical diverter.

26. A foamed gypsum slurry mixing system according to claim 25, wherein:

said foamed liquid inlet is in said helical diverter and is adjacent said second mixing chamber slurry inlet.

27. A mixer according to claim 26, wherein:

said foamed liquid inlet is adjacent said gypsum slurry inlet and positioned to direct the flow of foamed liquid at about seventy-five degrees to about one hundred five degrees relative to the direction of flow of said initial slurry into said gypsum slurry inlet.

28. A mixer according to claim 27, wherein:

said foamed liquid inlet is positioned to direct the flow of foamed liquid at about eighty degrees to about one hundred relative to the direction of flow of said initial slurry into said gypsum slurry inlet.

29. A mixer according to claim 27, wherein:

said foamed liquid inlet is positioned to direct the flow of foamed liquid at about ninety degrees relative to the direction of flow of said initial slurry into said gypsum slurry inlet.

30. A method of preparing foamed gypsum slurry, comprising:

flowing a gypsum water slurry into a cylindrical housing in a direction tangential to a side wall of said housing;

using a helical diverter to direct said slurry in a helical path in said housing;

inserting a foamed liquid into the gypsum water slurry; and flowing the mixture of foamed liquid and gypsum water slurry through a circular constriction within said housing.

31. A method according to claim 30, wherein:

said foamed liquid is inserted through said helical diverter.

32. A method according to claim 30, wherein:

said foamed liquid is inserted at about a ninety degree angle to the direction of flow of said slurry into said housing.

33. A method according to claim 30, wherein:

said gypsum water slurry is flowed into said housing through an opening near said helical diverter.

* * * * *

UNITED STATES PATENT AND TRADEMARK OFFICE
CERTIFICATE OF CORRECTION

PATENT NO. : 6,742,922 B2  Page 1 of 1
DATED : June 1, 2004
INVENTOR(S) : Shrader et al.

It is certified that error appears in the above-identified patent and that said Letters Patent is hereby corrected as shown below:

Title page,
Item [57], ABSTRACT,
Line 5, replace "diverted" with -- diverter --.

Column 7,
Line 38, replace "substituted of" with -- substitute for --.

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,742,922 B2 | Page 1 of 1 |
| APPLICATION NO. | : 10/263320 | |
| DATED | : June 1, 2004 | |
| INVENTOR(S) | : Gaylon Bruce Shrader et al. | |

It is certified that error appears in the above-identified patent and that said Letters Patent is hereby corrected as shown below:

In Column 7, line 38, replace "substituted of" with --substituted for--.

Signed and Sealed this

Twenty-eighth Day of August, 2012

David J. Kappos
*Director of the United States Patent and Trademark Office*